United States Patent
Wu et al.

(10) Patent No.: US 11,770,698 B2
(45) Date of Patent: Sep. 26, 2023

(54) MULTI-LINK TERMINAL, METHOD FOR ALLOCATING AN ADDRESS FOR A MULTI-LINK TERMINAL, NETWORK ACCESS DEVICE AND MEDIUM

(71) Applicant: CHENGDU XGIMI TECHNOLOGY CO., LTD., Sichuan (CN)

(72) Inventors: Hao Wu, Sichuan (CN); Fang Xie, Sichuan (CN); Yang Liao, Sichuan (CN)

(73) Assignee: CHENGDU XGIMI TECHNOLOGY CO., LTD., Chengdu (CN)

( * ) Notice: Subject to any disclaimer, the term of this patent is extended or adjusted under 35 U.S.C. 154(b) by 176 days.

(21) Appl. No.: 17/600,153

(22) PCT Filed: Aug. 12, 2020

(86) PCT No.: PCT/CN2020/108686
§ 371 (c)(1),
(2) Date: Sep. 30, 2021

(87) PCT Pub. No.: WO2022/027719
PCT Pub. Date: Feb. 10, 2022

(65) Prior Publication Data
US 2022/0322076 A1  Oct. 6, 2022

(30) Foreign Application Priority Data
Aug. 3, 2020 (CN) .................. 202010764629.9

(51) Int. Cl.
*H04W 4/00* (2018.01)
*H04W 8/26* (2009.01)
(Continued)

(52) U.S. Cl.
CPC ............... *H04W 8/26* (2013.01); *H04L 61/50* (2022.05); *H04W 76/11* (2018.02); *H04L 2101/622* (2022.05)

(58) Field of Classification Search
CPC ....... H04W 8/26; H04W 76/11; H04W 84/12; H04W 76/15
See application file for complete search history.

(56) References Cited

U.S. PATENT DOCUMENTS 10,484,980 B1   11/2019  Jiang et al.
10,568,152 B2   2/2020   Wang et al.
(Continued)

FOREIGN PATENT DOCUMENTS

CN    102843302 A   12/2012
CN    103228046 A   7/2013
(Continued)

OTHER PUBLICATIONS

The International search report for PCT Application No. PCT/CN2020/108686, dated May 8, 2021, 5 pages.
(Continued)

*Primary Examiner* — Omoniyi Obayanju
(74) *Attorney, Agent, or Firm* — East IP P.C.

(57) ABSTRACT

The application discloses a multi-link terminal, a method for allocating an address for the multi-link terminal, a network access device and a medium. The method for allocating the address for the multi-link terminal includes following steps: sending, by a logical entity affiliated with the multi-link terminal, an association request message to a network access device, wherein the association request message includes a MAC address of the multi-link terminal; and receiving, by the logical entity, an association response message sent by the network access device, wherein the association response message includes addresses and association identifiers allo-
(Continued)

cated by the network access device for logical entities affiliated with the multi-link terminal, and the addresses for the logical entities include respective link information bits.

16 Claims, 1 Drawing Sheet

(51) Int. Cl.
*H04W 76/11* (2018.01)
*H04L 61/50* (2022.01)
*H04L 101/622* (2022.01)

(56) References Cited

U.S. PATENT DOCUMENTS

| | | |
|---|---|---|
| 2019/0215884 A1 | 7/2019 | Patil et al. |
| 2019/0335454 A1* | 10/2019 | Huang ............... H04W 72/542 |

FOREIGN PATENT DOCUMENTS

| | | |
|---|---|---|
| CN | 103298077 A | 9/2013 |
| CN | 104519554 A | 4/2015 |
| CN | 105430674 A | 3/2016 |
| CN | 106028322 A | 10/2016 |
| CN | 107852745 A | 3/2018 |
| CN | 108156272 A | 6/2018 |
| CN | 111432044 A | 7/2020 |
| WO | 2020112244 A2 | 6/2020 |

OTHER PUBLICATIONS

The First Office Action for Chinese Application No. 202010764629.9, dated Oct. 13, 2020, 15 pages.
The Grant Notification for Chinese Application No. 202010764629.9, dated Oct. 29, 2020, 7 pages.
The First Office Action for Japan Application No. 2021-554404, dated Nov. 15, 2022, 6 pages.
Panasonic Corporation, Multi-link Setup clarifications, IEEE 802.11-20/0751r0, May 11, 2020, 18 pages.
Li, Ye, Design and Implementation of Multi-mode Wireless Networks Based on Wi-Fi, Jan. 31, 2018, 82 pages.
Guogang Huang (Huawei), Multi-link Association Follow Up, IEEE 802.11-20/0030r0, Jan. 11, 2020, 11 pages.
Jarkko Kneckt (Apple), AP MLD Beaconing and Discovery, IEEE 802.11-20/0865r0, Jun. 8, 2020, 26 pages.
Namyeong Kim (LG Electronics), MLO: Link Switching Method, IEEE 802.11-20/0412r0, Jun. 9, 2020, 13 pages.
Harry Wang (Tencent), MLD Address Management Discussion, IEEE 802.11-20/0512r3, Jun. 4, 2020, 15 pages.

* cited by examiner

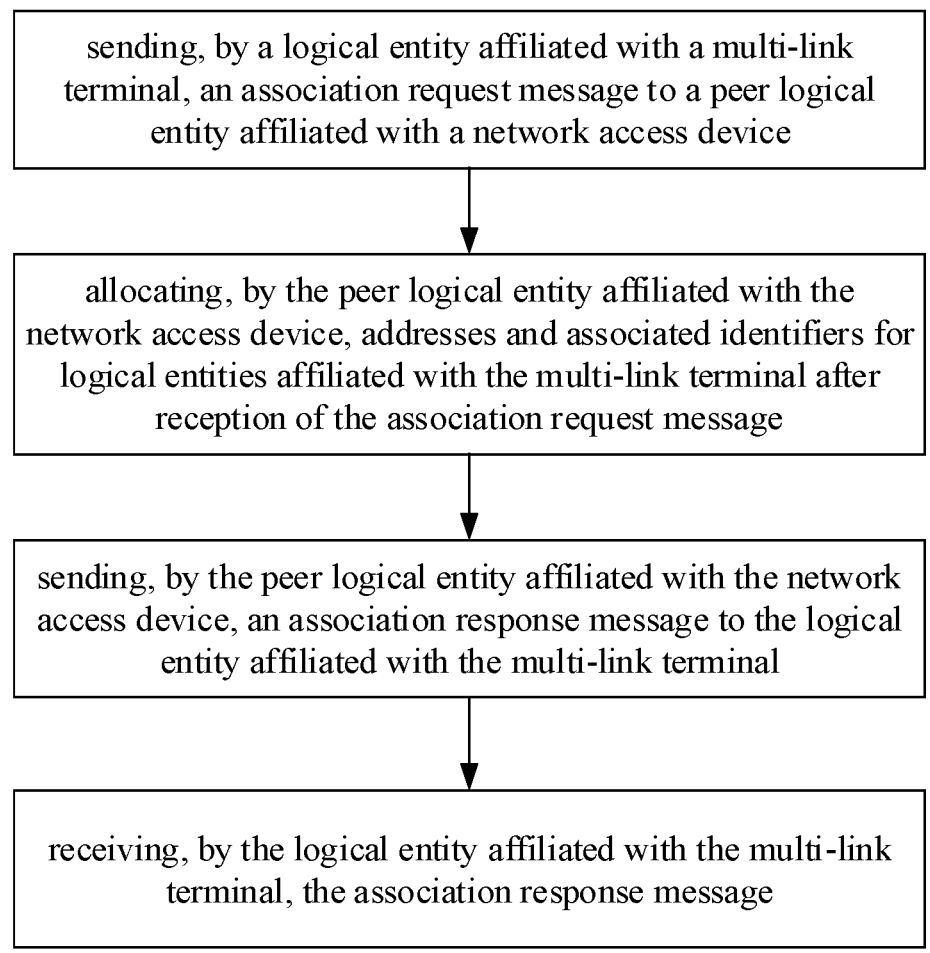

MULTI-LINK TERMINAL, METHOD FOR ALLOCATING AN ADDRESS FOR A MULTI-LINK TERMINAL, NETWORK ACCESS DEVICE AND MEDIUM

REFERENCE TO RELATED APPLICATION

The application is a national stage of an international application No, PCT/CN2020/108686 filed on Aug. 12, 2020, which claims a priority of the Chinese patent application No. 202010764629.9, filed on Aug. 3, 2020 and entitled by "MULTI-LINK TERMINAL, METHOD FOR ALLOCATING AN ADDRESS FOR A MULTI-LINK TERMINAL, NETWORK ACCESS DEVICE AND MEDIUM", both of which are incorporated herein by reference in their entireties.

TECHNICAL FIELD

The application relates to the field of wireless communication, and in particular to a multi-link terminal, a method for allocating an address for a multi-link terminal, a network access device and a medium.

BACKGROUND

An 802.11be network, also known as Extremely High Throughput (EHT) network, achieves extremely high throughput through a range of system features and various mechanism enhancements. As continuous growth in use of a wireless local area network (WLAN), it is becoming increasingly important to provide wireless data services for various environments, such as at home, in an office, or at a hotspot. In particular, video traffics will continue to be the main traffic type in many WLAN deployments. Due to emergence of 4*k* and 8*k* videos (with a rate of 20 Gbps in an uncompressed state), throughput requirements of these applications are continually being increased. New types of high-throughput and low-latency applications such as a virtual reality application, an augmented reality application, a gaming application, a remote office application, and a cloud computing application are also being greatly increased (for example, a real-time game requires a latency of less than 5 milliseconds).

In view of requirements of high throughput and strict latency of these applications, a user expects a higher throughput, a higher reliability, a small latency and jitter, and a higher power efficiency when using a WLAN to support such an application. A user also expects an improved integration with a Time Sensitive Network (TSN) to support the applications in a heterogeneous Ethernet or the WLAN. The 802.11be network aims to ensure competitiveness of the WLAN by further improving total throughput and reducing latency, while ensuring backward compatibility and coexistence with older technical standards. An 802.11 compatible device is operable at frequencies of 2.4 GHz, 5 GHz and 6 GHz.

Regarding the 802.11be network, it is proposed to establish multiple data transmission links between a terminal and an access point for simultaneous transmission to improve a transmission efficiency, so as to achieve the above discussed purposes.

SUMMARY

In a multi-link scenario, a physical terminal operates on multiple links through multiple logical entities. When a device leaves a factory, its manufacturer sets a MAC address for the device for uniquely identifying it, which is called a MAC address of a multi-link terminal. In a communication process in a WLAN, each multi-link terminal has multiple logical entities performed data transmission on different links. In addition to the MAC address of the multi-link terminal as a physical entity, each logical entity needs to have an address different from the MAC address of the multi-link terminal. However, it is uncertain that how many logical entities actually operate in a multi-link terminal, which depends on current service on the terminal, capabilities of a WLAN access point, whether there is a power saving requirement, etc., so it is not suitable to allocate a static MAC address. In view of this, the present application provides a multi-link terminal, a method for allocating an address for a multi-link terminal, a network access device and a computer readable storage medium.

In a first aspect of the present application, there is provided a method for allocating an address for a multi-link terminal, including: sending, by a logical entity affiliated with the multi-link terminal, an association request message to a network access device, wherein the association request message includes a media access control (MAC) address of the multi-link terminal; and receiving, by the logical entity, an association response message sent by the network access device, wherein the association response message includes addresses and association identifiers allocated by the network access device for logical entities affiliated with the multi-link terminal, and the addresses for the logical entities include respective link information bits.

In an embodiment, the association request message may further include a parameter of preferred links for indicating links that the terminal requests to operate.

In an embodiment, before sending the association request message to the network access device, the method may further include: selecting, by the multi-link terminal, a link on which the logical entity operates to obtain an operable link message of the network access device from a broadcast message or a probe response message.

In an embodiment, the link information bits in the addresses for the logical entities may be respective link identifiers.

In an embodiment, after receiving the association response message sent by the network access device, the method may further include: assigning, by the multi-link terminal according to the link information bits in the addresses for the logical entities, the addresses for the logical entities to logical entities that support or expect data transceiving on respective links corresponding to the link information bits, respectively.

In an embodiment, the method may further include: sending, by a first logical entity in the multi-link terminal that needs to change an operating link, a connection establishment request message or a link exchange request message to a target link, wherein the connection establishment request message or the link exchange request message includes an address of the first logical entity; receiving, by the first logical entity, a connection establishment response message or a link exchange response message sent by the network access device, wherein the connection establishment response message or the link exchange response message includes an address updated by the network access device for the first logical entity and an association identifier allocated by the network access device for the first logical entity; and setting, by the multi-link terminal, a local address of the first logical entity with the address for the first logical entity in the connection establishment response message or the link exchange response message.

In an embodiment, the MAC address of the multi-link terminal may include a link information bit for indicating that the address is an address of the multi-link terminal.

In an embodiment, the link information bit may include consecutive bits from a $25^{th}$ bit to a $48^{th}$ bit of the MAC address, and a number of bits in the link information bit ranges from 2 to 5.

In a second aspect of the present application, there is provided a method for allocating an address for a multi-link terminal, including: receiving, by a second logical entity affiliated with a network access device, an association request message sent by the multi-link terminal, wherein the association request message includes a MAC address of the multi-link terminal, and the MAC address includes a link information bit; allocating, by the network access device, addresses and association identifiers for logical entities affiliated with the multi-link terminal; and sending, by the second logical entity, an association response message to the multi-link terminal, wherein the association response message includes the addresses and the association identifiers allocated by the network access device for the logical entities affiliated with the multi-link terminal.

In an embodiment, the association request message may further include a parameter of Preferred Links for indicating links that the terminal requests to operate.

In an embodiment, the allocating, by the network access device, the addresses and the association identifiers for the logical entities affiliated with the multi-link terminal may include: allocating the addresses for the logical entities affiliated with the multi-link terminal according to link identifiers and the MAC address of the multi-link terminal in the case that the link information bit in the MAC address of the multi-link terminal indicates that the address is an address of the multi-link terminal, wherein the link identifiers are respective link identifiers corresponding to operable links of the network access device; and allocating the association identifiers for the logical entities that have been allocated with the addresses.

In an embodiment n, the allocating, by the network access device, the addresses and the association identifiers for the logical entities affiliated with the multi-link terminal may include: allocating the addresses for the logical entities affiliated with the multi-link terminal according to link identifiers and the MAC address of the multi-link terminal in the case that the link information bit in the MAC address of the multi-link terminal indicates that the address is an address of the multi-link terminal, wherein the link identifiers are respective link identifiers corresponding to the links indicated by the parameter of preferred links; and allocating the association identifiers for the logical entities that has been allocated with the addresses.

In an embodiment, the allocating, by the network access device, the addresses and association identifiers for the logical entities affiliated with the multi-link terminal may include: allocating the association identifiers for the logical entities affiliated with the multi-link terminal after it is decided to allow connections of the logical entities affiliated with the multi-link terminal in the case that the link information bit in the MAC address of the multi-link terminal indicates that the address is not an address of the multi-link terminal.

In an embodiment, the allocating the addresses for the logical entities affiliated with the multi-link terminal according to the link identifiers and the MAC address of the multi-link terminal may include: setting the link information bits of the MAC address of the multi-link terminal with the link identifiers.

In an embodiment, the method may further include: receiving, by the network access device, a connection establishment request message or a link exchange request message sent by the multi-link terminal on a target link, wherein the connection establishment request message or the link exchange request message comprises an address of a first logical entity that needs to change an operating link; and setting a link information bit in the address of the first logical entity with a link identifier of the target link in the case that the link information bit in the address of the first logical entity in the connection establishment request message or the link exchange request message is different from the link identifier of the target link, and including an updated address for the first logical entity and an association identifier allocated for the first logical entity in the connection establishment response message or the link exchange response message for sending to the first logical entity In an embodiment, the link information bit may include consecutive bits from a $25^{th}$ bit to a $48^{th}$ bit of the MAC address, and a number of bits in the link information bit ranges from 2 to 5.

In a third aspect of the present application, there is provided a multi-link terminal, which is a physical device and performs data transceiving independently on different links through multiple logical entities having their respective data transceiving modules. The multi-link terminal includes: a first logical entity configured to send an association request message to a network access device, wherein the association request message includes a MAC address of the multi-link terminal; and to receive an association response message sent by the network access device, wherein the association response message includes addresses and association identifiers allocated by the network access device for logical entities affiliated with the multi-link terminal, the addresses for the logical entices include respective link information bits.

In a fourth aspect of the present application, there is provided a network access device, which is a physical device and performs data transceiving independently on different links through multiple logical entities having their respective data transceiving modules. The network access device includes: a second logical entity configured to receive an association request message sent by a multi-link terminal, wherein the association request message includes a MAC address of the multi-link terminal, and the MAC address includes a link information bit; and to send an association response message to the multi-link terminal, wherein the association response message includes addresses and association identifiers allocated by the network access device for logical entities affiliated with the multi-link terminal; and an address allocation unit configured to allocate the addresses and the association identifiers for the logical entities affiliated with the multi-link terminal.

In a fifth aspect of the present application, there is provided a multi-link terminal, including: a memory storing programs; and a processor coupled to the memory and configured to execute the programs to perform the method for allocating the address for the multi-link terminal according to the first aspect or any one of the possible implementations for the first aspect.

In a sixth aspect of the present application, there is provided a network access device, including: a memory storing programs; and a processor coupled to the memory and configured to execute the programs to perform the method for allocating the address for the multi-link terminal according to the second aspect or any one of the possible implementations for the second aspect.

In a seventh aspect of the present application, there is provided a computer-readable storage medium including computer instructions, which are executed on a terminal to perform the method for allocating the address for the multi-link terminal according to the first aspect or any one of the possible implementations for the first aspect, or the second aspect or any one of the possible implementations for the second aspect.

It should be noted that the multi-link terminal described in the third aspect and the fifth aspect of the present application is configured to perform the method provided in the first aspect, and the network access device described in the fourth aspect and the sixth aspect is configured to perform the method provided in the second aspect, and the computer-readable storage medium described in the seventh aspect is configured to perform the method provided in either the first aspect or the second aspect, so that it can achieve the same beneficial effects as the method in the first aspect or the second aspect, and will not be repeated in the embodiments of the present application.

The application, by defining link information bits in a MAC address of a terminal and allocating addresses for logical entities affiliated with the terminal according to link identifiers and the MAC address of the terminal, provides a method for dynamically allocating addresses for the logical entities, which can flexibly allocate the addresses while guarantying uniqueness of the respective addresses, thereby providing a guaranty for a communication process.

BRIEF DESCRIPTION OF THE DRAWINGS

The application will be described by way of embodiments and with reference to the accompanying drawings, in which:

FIG. 1 is a flowchart of a method for allocating an addresses for a multi-link terminal according to an embodiment of the application.

DETAILED DESCRIPTION

In order for a better understanding by those skilled in the art of technical solutions of the application, technical solutions in embodiments of the application will be clearly and completely described in conjunction with the accompanying drawings of the embodiments of the application. Apparently, the described embodiments are only a part of embodiments of the application, rather than all the embodiments. It should be understood that the specific embodiments described here are only used to explain the application, rather than limiting the application. Based on the embodiments in the application, those skilled in the art can anticipate other embodiments without inventive efforts, all of which fall within the protection scope of the application. In addition, although the disclosure in the application is described by way of one or more exemplary examples, it should be understood that various aspects of the disclosure can be individually configured as respective complete technical solutions. The following embodiments and features thereof can be combined with each other without conflicts.

In the embodiments of the application, terms such as "exemplary" and "for example" are used for providing examples, explanations, or illustrations. Any embodiment or design solution described as an "example" in the application should not be construed as being more preferable or having more advantageous than other embodiments or design solutions. Rather, the term "example" is used to present a concept in a concrete way.

Unless otherwise defined, the technical or scientific terms used in the application have their usual meanings as understood by those skilled in the field. The terms of "first", "second" and similar words used in the application do not denote any order, quantity or importance, but are only used for distinguishing descriptions. The terms of "include" or "comprise" and other similar words mean that an element or item appearing before the word contains an element or item listed after the word and their equivalents, and does not exclude other elements or items. The term "and/or" includes any and all combinations of one or more of associated items as listed. The technical solutions in the application will be described below in conjunction with the accompanying drawings.

In the following embodiments, a multi-link terminal includes multiple logical entities, and each logical entity performs data transmission with a network access device through a link. The link is a wireless resource used for the data transmission.

FIG. 1 is a flowchart of a method for allocating an addresses for a multi-link terminal according to an embodiment of the application.

As shown in FIG. 1, the method for allocating an addresses for a multi-link terminal includes: sending, by a logical entity affiliated with the multi-link terminal, an association request message to a network access device, wherein the association request message includes a media access control (MAC) address of the multi-link terminal that contains a link information bit. In some embodiments, the association request message may further include a parameter of multi-link capability for indicating whether the multi-link terminal supports multiple links. In some embodiments, the association request message may further includes a parameter of preferred links for indicating links that the multi-link terminal requests to operate.

After a peer logical entity affiliated with the network access device receives the association request message sent by the multi-link terminal, the network access device allocates addresses and association identifiers for logical entities affiliated with the multi-link terminal. For example, in the case that the association request message does not include the parameter of preferred links, the network access device allocates the addresses for the logical entities affiliated with the multi-link terminal according to link identifiers corresponding to operable links of the network access device and the MAC address of the multi-link terminal; and in the case that the association request message includes the parameter of preferred links, the network access device allocates the addresses for the logical entities affiliated with the multi-link terminal according to link identifiers corresponding to the links indicated by the parameter of preferred links and the MAC address of the multi-link terminal.

The peer logical entity affiliated with the network access device sends an association response message to the logical entity affiliated with the multi-link terminal, wherein the association response message includes the addresses and the association identifiers allocated by the network access device for the logical entities affiliated with the multi-link terminal. The logical entity affiliated with the multi-link terminal receives the association response message sent by the peer logical entity affiliated with the network access device.

In some embodiments, before the logical entity affiliated with the multi-link terminal sends the association request message to the network access device, the method may further include: selecting, by the multi-link terminal, a link on which the logical entity operates to obtain an operable link message of the network access device from a broadcast message or a probe response message.

In some embodiments, after the logical entity affiliated with the multi-link terminal receives the association response message sent by the network access device, the multi-link terminal may assign the addresses for the logical entities to logical entities that support or expect data transceiving on respective links corresponding to the link information bits according to the link information bits in the addresses for the logical entities, respectively.

In some embodiments, due to a change in service, it is may be the case that a logical entity affiliated with the multi-link terminal needs to change an operating link. At this time, a first logical entity in the multi-link terminal that needs to change an operating link sends a connection establishment request message or a link exchange request message to a target link, wherein the connection establishment request message or the link exchange request message includes an address of the first logical entity. After receiving the connection establishment request message or the link exchange request message on the target link, the network access device checks a link information bit in the address of the first logical entity, and if the link information bit is different from a link identifier of the target link, the network access device sets the link information bit in the address of the first logical entity with the link identifier of the target link and includes such updated address of the first logical entity and an association identifier allocated for the first logical entity in the connection establishment response message or the link exchange response message for sending to the first logical entity. After receiving the connection establishment response message or the link exchange response message, the multi-link terminal set a local address of the first logical entity with the received address for the first logical entity.

The application will be further illustrated by a specific embodiment below.

In the following specific embodiment, STA MLD represents a multi-link terminal, STA represents a logical entity affiliated with the multi-link terminal, and AP MLD represents a network access point, which is a type of network access device. In other embodiments, a network access device may be any other device, such as a router, or the like. The following embodiment is provided by taking the AP MLD as an exemplary example.

The multi-link terminal STA MLD has a MAC address, which includes a total of forty-eight bits, wherein the first twenty-four bits represent a number of a network hardware manufacturer, which is allocated by IEEE (Institute of Electrical and Electronics Engineers). The registry and management institute IEEE allocates for different manufacturers with codes for distinguishing among them. The last twenty-four bits are allocated by the manufacturer. In the last twenty-four bits, three consecutive bits (such as the $25^{th}$, $26^{th}$, and $27^{th}$ bits of the address, which are called as a multi-link information bit in the application) are set as 000, and the remaining twenty-one bits are not limited. Alternatively, in the last twenty-four bits, two consecutive bits (such as the $25^{th}$ and $26^{th}$ bits of the address) are set as 00, and the remaining twenty-two bits are not limited. The number of bits in the last twenty-four bits for the particular configuration depends on the number of links. For example, if there are three links, two of them can be set as the particular configuration bit; and if there are five links, three of them would be set as the particular configuration bit, which are called as the multi-link information bit.

The following description is provided by taking three links (link1, link2, and link3) as an example. That is, the multi-link information bit include two bits, the STA MLD includes three logical entities STA1, STA2 and STA3, and the AP MLD includes three logical entities AP1, AP2 and AP3. However, the application is not limited hereto, but its implementation is applicable to a scenario with two links or more than three links.

In the specific embodiment, the method for allocating an address for a multi-link terminal includes the following steps.

1. The multi-link terminal STA MLD selects a link on which the logical entity STA1 operates to obtain operable link information of the multi-link network access point AP MLD from a broadcast message (Beacon Message) or a probe response (Probe Response) message. For example, the operable link information include a center frequency, an operable bandwidth, or space division multiplexing information, and the like.

2. The STA1 sends an association request (Association Request) message to the logical entity AP1 of the AP MLD that operates on the same link. The AP1 is a peer logical entity affiliated with the STA1. For example, the association request message includes: SA or TA configured with a MAC address of the STA MLD. As an example, the MAC address of the STA MLD is shown in Table 1, where OUI (Organizational Unique Identifier) represents an organizational unique identifier.

TABLE 1

| OUI (twenty-four bits) | 0 | 0 | Allocated bits by manufacture (twenty-two bits) |
|---|---|---|---|

In the central part, there is the "link information bit" set as "00", which means that the address is a physical device address. The remaining bits are left for setting link information.

In an example, the "link information bit" may be consecutive bits from a $25^{th}$ bit to a $48^{th}$ bit of the MAC address (which has its bits started from the $1^{st}$ bit), and a number of bits in the link information bit ranges from 2 to 5.

The multi-link capability may be set for indicating whether the STA MLD supports multiple links.

The preferred links may be set for indicating one or more links that the STA MLD requests to operate. In some embodiments, information about the one or more links that the STA MLD requests to operate may be included in any other parameters such as a capability parameter or an operation parameter, instead of being indicated separately in the parameter of preferred links. In this case, the parameter of preferred links is set implicitly. For example, the STA MLD may include information that it supports 2.4 GHz and 5 GHz in the capability parameter for sending to the AP MLD, such that the AP MLD reads the information in the capability parameter to know that the STA MLD requests to operate links corresponds to 2.4 GHz and 5 GHz.

3. After the AP1 receives the Association Request message, the AP MLD checks whether the "link information bit" in the MAC address of the STA MLD is set as "00". If the "link information bit" in the MAC address of the STA MLD is set as "00", the AP MLD allocates, after determining that the STA MLD can use multiple links, addresses for the logical entities affiliated with the STA MLD according to link identifiers and the MAC address of the STA MLD. In the case that the Association Request message includes the parameter of preferred links or is configured by the STA MLD with the parameter of preferred links implicitly, the link identifiers are link identifiers corresponding to the links indicated by the parameter of preferred links. Otherwise, the link identifiers are link identifiers corresponding to operable links of the network access device. If the "link information bit" in the MAC address of the STA MLD is not set as "00", the AP MLD allocates, after deciding to allow connections of the logical entities affiliated with the STA MLD, association identifiers (AIDs) for the logical entities affiliated with the STA MLD.

The parameter of AID (Association Identifier) provides an alias of the STA. The AP MLD maintains locally an association identifier table, in which each AID is bound to a MAC address of a corresponding STA. The association identifiers range from 0 to 2007, which also shows that an AP MLD can associate a maximum of 2007 nodes in the protocol. The position where AID=0 is a reserved field and not allocated to any node, and is used to represent all of multicasts and broadcasts.

In the specific embodiment, the link information of the AP MLD is shown in Table 2.

TABLE 2

| Link Identifier | Operation frequency |
| --- | --- |
| 1 | 2.4 GHz |
| 2 | 5 GHz |
| 3 | 6 GHz |

The method for allocating addresses for the respective logical entities affiliated with the STA MLD then includes: setting addresses for every one of the STAs of the STA MLD according to link identifiers and the MAC address of the STA MLD, that is, setting the link information bit in the MAC address of the STA MLD with the link identifiers to form the addresses for the respective STAs, which is shown exemplarily as follows:

For operation on link "1", the address is shown in Table 3.

TABLE 3

| OUI (twenty-four bits) | 0 | 1 | Allocated bits by manufacture (twenty-two bits) |
| --- | --- | --- | --- |

For operation on link "2", the address is shown in Table 4.

TABLE 4

| OUI (twenty-four bits) | 1 | 0 | Allocated bits by manufacture (twenty-two bits) |
| --- | --- | --- | --- |

For operation on link "3", the address is shown in Table 5.

TABLE 5

| OUI (twenty-four bits) | 1 | 1 | Allocated bits by manufacture (twenty-two bits) |
| --- | --- | --- | --- |

4. The AP MLD allocates association identifiers for the logical entities in the STA MLD that have been allocated with their addresses.

5. The AP1 sends an association response (Association Response) message to the STA1. The association response message includes: the addresses and the association identifiers allocated for the logical entities.

6. After the STA 1 receives the association response message, the STA MLD assigns the addresses for the logical entities to logical entities that support or expect data transceiving on respective links corresponding to the link information bits according to the link information bits in the addresses for the logical entities, respectively. For example, the STA1 of the STA MLD supports operation at frequencies of 2.4 GHz, 5 GHz and 6 GHz (i.e. link1, link2 and link3), the STA2 supports operation at frequencies of 2.4 GHz and 5 GHz (i.e. link1 and link2), and the STA3 supports operation at a frequency of 6 GHz (i.e. link3). If the STA1 expects to operate link1 to transmit data and the STA2 expects to operate link2 to transmit data, the STA MLD will assign the address shown in Table 3 to the STA1, the address shown in Table 4 to the STA2, and the address shown in Table 5 to the STA. If the STA1 expects to operate link2 to transmit data and the STA2 expects to operate link1 to transmit data, the STA MLD will assign the address shown in Table 4 to STA1, and the address shown in Table 3 to STA2. In this way, address allocation for the logical entities is much flexible.

7. When a STA in the STA MLD needs to change its operating link, for example, it is the STA1 that needs to change its operating link to a target link of the link3, the STA1 sends a connection establishment request message or link exchange request message to the link3, wherein the connection establishment request message or the link exchange request message includes the address of the STA'.

8. After the AP MLD receives the connection establishment request message or the link exchange request message on the link3, it checks the link information bit in the address of STA1. If the link information bit is different from a link identifier of the link3, it will change the link information bit in the address of STA1 to the link identifier of the link3, and includes such updated address for the STA1 and an allocated association identifier for the STA1 in the connection establishment response message or the link exchange response message for sending to the STA1.

9. After the STA1 receives the connection establishment response message or the link exchange response message sent by the peer logical entity affiliated with the AP MLD, the STA MLD sets a local address of the STA1 with the address of the STA1 in the connection establishment response message or the link exchange response message.

The embodiments of the present application further provide a multi-link terminal, which is configured to implement the method performed by a multi-link terminal in the foregoing embodiments. The terminal may be implemented by hardware or by hardware executing corresponding software. The hardware or software includes one or more units (e.g. the first logical entity) corresponding to the above-mentioned functions.

The embodiments of the present application further provide a network access device, which is configured to implement the method performed by a network access device in the foregoing embodiments. The network access device may be implemented by hardware or by hardware executing corresponding software. The hardware or software includes one or more units (e.g. the second logical entity and the allocation unit) corresponding to the above-mentioned functions.

The embodiments of the present application further provides a multi-link terminal, including a memory storing programs and a processor coupled to the memory and configured used execute the programs to implement the method performed by a multi-link terminal in the foregoing embodiments.

The embodiments of the present application further provides a network access device, including a memory for storing programs, and a processor coupled to the memory and configured to execute the programs to implement the method performed by a network access device in the foregoing embodiments.

The embodiments of the present application further provide a computer-readable storage medium including computer instructions, which are executed on a terminal to implement the method performed by a multi-link terminal or a network access device in the foregoing embodiments.

It should be understood that the serial numbers for the above-mentioned processes in various embodiments of the present application does not mean an order of execution. Some or all of the steps can be executed in parallel or one after the other. The order of execution of the respective processes should be determined on the basis of their functions and an intrinsic logic thereof, and it should not define any limitation to the implementation processes of the embodiments of the present application.

It should be anticipated by those skilled in the art that the various units and algorithm steps of the examples described in conjunction with the embodiments of the application can be implemented by electronic hardware or a combination of computer software and electronic hardware. Whether these functions are implemented by hardware or software depends on a specific application and design constraint conditions of the technical solution. Those skilled in the art can use different methods for respective specific applications to implement the described functions, which should not be considered beyond the scope of the application.

It should be understood by those skilled in the art that specific operation processes of the above-described system, device and unit can refer to corresponding processes in the foregoing method embodiments, and thus are not repeated in order for convenience and conciseness.

It should be understood that the system, device and method disclosed in the embodiments of the application may be implemented in other ways. For example, the device embodiments described above are only illustrative, and division of the units is only a division based on logical functions, and may be any other division in an actual implementation where multiple units or components may be combined or integrated into another system, or some features can be ignored or not implemented, for example. In addition, the shown or discussed mutual coupling or direct coupling or communication connection may be alternatively an indirect coupling or communication connection through some interfaces, devices or units, and may be in electrical, mechanical or other forms.

The units described as separate components may or may not be physically separated, and the components shown as units may or may not be physical units, that is, they may be located in one place, or may be distributed on multiple network units. Some or all of the units may be selected according to actual needs to achieve the objectives of the solutions of the embodiments.

In addition, the functional units in each embodiment of the application may be integrated into one processing unit, or may exist individually and physically, or may be integrated into respective units on a basis of two or more units.

If the function is implemented in a form of a software functional unit and sold or used as an independent product, it can be stored in a computer readable storage medium. Based on this understanding, the essential technical solutions of the application or a part of the technical solutions that constitutes contributions on the related art or a part of the technical solutions can be embodied in a form of a software product, and the computer software product may be stored in a storage medium including instructions that are executed by a computer device (which may be a personal computer, a server, a network device, or a terminal device, etc.) to perform all or a part of the method steps described in the various embodiments of the application. The aforementioned storage medium may include various media that can store program codes such as a USB disk, a mobile hard disk, a ROM, a RAM, a magnetic disk, or an optical disk.

The terms used in the embodiments of the application are provided only for the purpose of describing specific embodiments, and are not intended to limit the present invention. The singular forms indicated by the words of "a", "said" and "the" in the embodiments of the application and the appended claims are also intended to include plural forms, unless it is particularly indicated. It should also be understood that the term "and/or" as used herein refers to and includes any or all possible combinations of one or more associated items as listed. The character "I" in the application generally means that the associated items before and after it are in an "or" relationship.

Depending on context, the word "if" as used herein can be interpreted as "when" or "upon" or "in response to a determination" or "in response to a detection". Similarly, depending on context, the phrase "if it is determined that (alleged condition or event)" or "if it is detected that (alleged condition or event)" can be interpreted as "when it is determined that" or "in response to a determination" or "when it is detected (alleged condition or event)" or "in response to a detection (alleged condition or event)".

It should be understand by those skilled in the art that all of or a part of the steps in the method of the above-discussed embodiments can be implemented by a relevant hardware as instructed by programs. The programs may be stored in a readable storage medium of a device, and are executed to perform all of or a part of the steps. The storage medium may be a FLASH, an EEPROM, etc.

The specific embodiments of the application have been described above, but the protection scope of the application is not limited thereto. Within the technical scope of the application, those skilled in the art can easily anticipate any changes or substitutions, which fall with the protection scope of the application. Therefore, the protection scope of the application is determined by the protection scope of the appended claims.

What is claimed is:

1. A method for allocating an address for a multi-link terminal, comprising:

sending, by a logical entity affiliated with the multi-link terminal, an association request message to a network access device, wherein the association request message comprises a media access control (MAC) address of the multi-link terminal, and the MAC address of the multi-link terminal comprises a link information bit for indicating that the MAC address is an address of the multi-link terminal; and receiving, by the logical entity, an association response message sent by the network access device, wherein the association response message comprises addresses and association identifiers allocated by the network access device for logical entities affiliated with the multi-link terminal, the addresses for the logical entities comprise respective link information bits, and the link information bits in the addresses for the logical entities are respective link identifiers; and assigning, by the multi-link terminal according to the link information bits in the addresses for the logical entities, the addresses for the logical entities to logical entities that support or expect data transceiving on respective links corresponding to the link information bits.

2. The method for allocating the address for the multi-link terminal according to claim 1, wherein the association request message further comprises a parameter of preferred links for indicating links that the multi-link terminal requests to operate.

3. The method for allocating the address for the multi-link terminal according to claim 1, wherein before sending the association request message to the network access device, the method further comprises:

selecting, by the multi-link terminal, a link on which the logical entity operates to obtain an operable link message of the network access device from a broadcast message or a probe response message.

4. The method for allocating the address for the multi-link terminal according to claim 1, further comprises:

sending, by a first logical entity in the multi-link terminal that needs to change an operating link, a connection establishment request message or a link exchange request message to a target link, wherein the connection establishment request message or the link exchange request message comprises an address of the first logical entity;

receiving, by the first logical entity, a connection establishment response message or a link exchange response message sent by the network access device, wherein the connection establishment response message or the link exchange response message comprises an address updated by the network access device for the first logical entity and an association identifier allocated by the network access device for the first logical entity; and setting, by the multi-link terminal, a local address of the first logical entity with the address for the first logical entity in the connection establishment response message or the link exchange response message.

5. The method for allocating the address for the multi-link terminal according to claim 1, wherein the link information bit comprises consecutive bits from a $25^{th}$ bit to a $48^{th}$ bit of the MAC address, and a number of bits in the link information bit ranges from 2 to 5.

6. A method for allocating an address for a multi-link terminal, comprising:

receiving, by a second logical entity affiliated with a network access device, an association request message sent by the multi-link terminal, wherein the association request message comprises a MAC address of the multi-link terminal, and the MAC address comprises a link information bit for indicating that the MAC address is an address of the multi-link terminal;

allocating, by the network access device, addresses and association identifiers for logical entities affiliated with the multi-link terminal; and sending, by the second logical entity, an association response message to the multi-link terminal, wherein the association response message comprises the addresses and the association identifiers allocated by the network access device for the logical entities affiliated with the multi-link terminal, wherein the addresses for the logical entities comprise respective link information bits, and the link information bits in the addresses for the logical entities are respective link identifiers, wherein the allocating, by the network access device, the addresses and the association identifiers for the logical entities affiliated with the multi-link terminal comprises:

allocating the addresses for the logical entities affiliated with the multi-link terminal according to link identifiers and the MAC address of the multi-link terminal in the case that the link information bit in the MAC address of the multi-link terminal indicates that the MAC address is an address of the multi-link terminal, wherein the link identifiers are respective link identifiers corresponding to operable links of the network access device; and allocating the association identifiers for the logical entities that have been allocated with the addresses.

7. The method for allocating the address for the multi-link terminal according to claim 6, wherein the association request message further comprises a parameter of Preferred Links for indicating links that the multi-link terminal requests to operate.

8. The method for allocating the address for the multi-link terminal according to claim 7, wherein the allocating, by the network access device, the addresses and the association identifiers for the logical entities affiliated with the multi-link terminal comprises:

allocating the addresses for the logical entities affiliated with the multi-link terminal according to link identifiers and the MAC address of the multi-link terminal in the case that the link information bit in the MAC address of the multi-link terminal indicates that the MAC address is an address of the multi-link terminal, wherein the link identifiers are respective link identifiers corresponding to the links indicated by the parameter of preferred links; and allocating the association identifiers for the logical entities that has been allocated with the addresses.

9. The method for allocating the address for the multi-link terminal according to claim 6, wherein the allocating, by the network access device, the addresses and the association identifiers for the logical entities affiliated with the multi-link terminal comprises:

allocating the association identifiers for the logical entities affiliated with the multi-link terminal after it is decided to allow connections of the logical entities affiliated with the multi-link terminal in the case that the link information bit in the MAC address of the multi-link terminal indicates that the MAC address is not an address of the multi-link terminal.

10. The method for allocating the address for the multi-link terminal according to claim 6, wherein the allocating the addresses for the logical entities affiliated with the multi-link terminal according to the link identifiers and the MAC address of the multi-link terminal comprises:

setting the link information bits of the MAC address of the multi-link terminal with the link identifiers.

11. The method for allocating the address for the multi-link terminal according to claim 10, further comprising:

receiving a connection establishment request message or a link exchange request message sent by the multi-link terminal on a target link, wherein the connection establishment request message or the link exchange request message comprises an address of a first logical entity of the multi-link terminal that needs to change an operating link; and setting a link information bit in the address of the first logical entity with a link identifier of the target link in the case that the link information bit in the address of the first logical entity in the connection establishment request message or the link exchange request message is different from the link identifier of the target link, and including an updated address for the first logical entity and an association identifier allocated for the first logical entity in the connection establishment response message or the link exchange response message for sending to the first logical entity.

12. The method for allocating the address for the multi-link terminal according to claim 9, wherein the link information bit comprises consecutive bits from a 25$^{th}$ bit and a 48$^{th}$ bit of the MAC address, and a number of bits in the link information bit ranges from 2 to 5.

13. A multi-link terminal, comprising:

a memory storing programs; and a processor coupled to the memory, and configured to execute the programs to perform the method for allocating the address for the multi-link terminal according to claim 1.

14. A network access device, comprising:

a memory storing programs;

a processor coupled to the memory and configured to execute the programs to perform the method for allocating the address for the multi-link terminal according to claim 6.

15. A non-transitory computer-readable storage medium comprising computer instructions, which are executed on a terminal to perform the method for allocating the address for the multi-link terminal according to claim 1.

16. A non-transitory computer-readable storage medium comprising computer instructions, which are executed on a terminal to perform the method for allocating the address for the multi-link terminal according to claim 6.

* * * * *